United States Patent
Ikedo

(10) Patent No.: US 9,979,910 B2
(45) Date of Patent: May 22, 2018

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventor: Hideki Ikedo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 14/747,303

(22) Filed: Jun. 23, 2015

(65) Prior Publication Data
US 2015/0381912 A1 Dec. 31, 2015

(30) Foreign Application Priority Data
Jun. 25, 2014 (JP) ................................ 2014-130684

(51) Int. Cl.
*H04N 5/361* (2011.01)
*H04N 5/343* (2011.01)
*H04N 5/347* (2011.01)
*H04N 5/3745* (2011.01)

(52) U.S. Cl.
CPC ............. *H04N 5/361* (2013.01); *H04N 5/343* (2013.01); *H04N 5/347* (2013.01); *H04N 5/37457* (2013.01)

(58) Field of Classification Search
CPC ........ H04N 5/361; H04N 5/343; H04N 5/347; H04N 5/37457
See application file for complete search history.

(56) References Cited

U.S. PATENT DOCUMENTS

| 6,166,768 A | * | 12/2000 | Fossum | G11C 19/282 257/E27.134 |
| 8,089,109 B2 | * | 1/2012 | Shinomiya | H01L 27/14647 257/290 |
| 9,433,394 B2 | * | 9/2016 | Omura | G03B 42/04 |
| 2014/0036114 A1 | * | 2/2014 | Yoneda | H04N 5/361 348/247 |

FOREIGN PATENT DOCUMENTS

JP 2008-118293 A 5/2008

* cited by examiner

*Primary Examiner* — Georgia Y Epps
*Assistant Examiner* — Don Williams
(74) *Attorney, Agent, or Firm* — Cowan, Liebowitz & Latman, P.C.

(57) ABSTRACT

An image capturing apparatus comprises a pixel region in which unit pixels are disposed, a floating diffusion portion which converts signal charges into voltage signals, an output line on which a signal based on a voltage at the floating diffusion portion is output, and a switching unit that switches between a first readout mode, in which all of the signal charges from the plurality of photoelectric conversion portions are transferred to the floating diffusion portion and read out from the output line, and a second readout mode, in which the signal charges from the plurality of photoelectric conversion portions are transferred at least one at a time to the floating diffusion portion and read out from the output line independently, wherein the switching unit switches the readout mode based on a dark current amount.

12 Claims, 12 Drawing Sheets

FIG. 7A

MODE SELECTION TABLE (tmp < 45°C)

|  | Tv < 15s | 15s ≤ Tv < 30s | 30s ≤ Tv |
|---|---|---|---|
| ISO < 800 | MERGING | MERGING | MERGING |
| 800 ≤ ISO < 1600 | MERGING | MERGING | INDEPENDENT |
| 1600 ≤ ISO | MERGING | INDEPENDENT | INDEPENDENT |

FIG. 7B

MODE SELECTION TABLE (45°C ≤ tmp)

|  | Tv < 15s | 15s ≤ Tv < 30s | 30s ≤ Tv |
|---|---|---|---|
| ISO < 800 | MERGING | MERGING | INDEPENDENT |
| 800 ≤ ISO < 1600 | MERGING | INDEPENDENT | INDEPENDENT |
| 1600 ≤ ISO | INDEPENDENT | INDEPENDENT | INDEPENDENT |

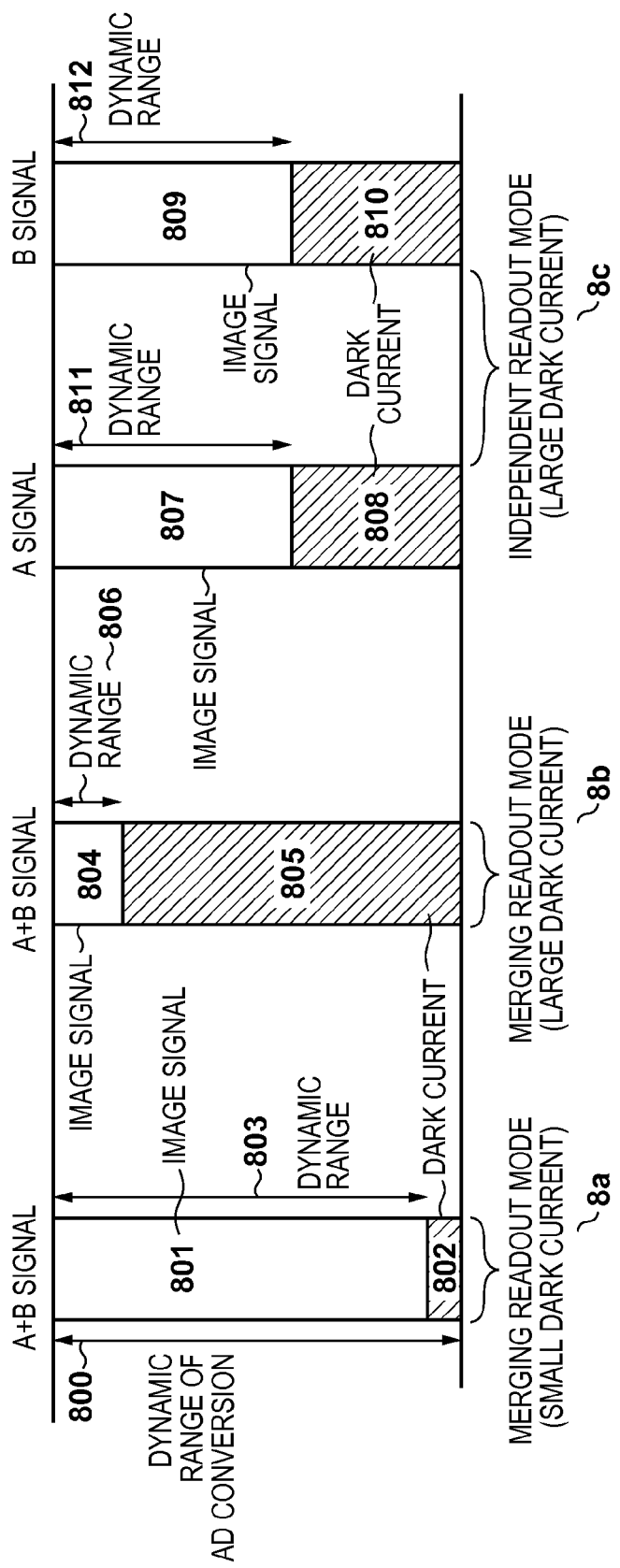

IMAGE CAPTURING APPARATUS AND CONTROL METHOD THEREOF, AND STORAGE MEDIUM

BACKGROUND OF THE INVENTION

Field of the Invention

The present invention relates to image capturing apparatuses and control methods thereof.

Description of the Related Art

An image sensor in which a plurality of photodiodes are arranged two-dimensionally is used in a typical digital camera. Thermal noise produces dark current in the photodiodes in such an image sensor, and such dark current is a cause of a drop in dynamic range and deterioration of image quality.

Accordingly, a method is used in which a pixel that has a photodiode and a pixel that does not have a photodiode are disposed within a light-shielded pixel region (an optical black region), a dark current amount is estimated based on a difference between output signals from the stated pixels, and image capturing pixels are corrected. Meanwhile, because dark current depends on the temperature and increases as the temperature rises, a method that carries out correction based on the temperature has been proposed (Japanese Patent Laid-Open No. 2008-118293).

An analog gain based on an ISO sensitivity is multiplied within the image sensor in a typical image capturing apparatus. An output signal from the image sensor then undergoes analog-digital (A/D) conversion in a signal processing circuit, and dark current correction, color interpolation processing, and so on is carried out.

Incidentally, because dark current depends on the temperature, an accumulation time, and so on, dark current increases in high-temperature environments and during long exposures. Furthermore, in the case where an analog gain is multiplied within the image sensor, dark current is also gain-multiplied as a result, and thus the dark current amount increases at higher ISO sensitivities. There is thus the possibility that a dynamic range of the A/D conversion carried out in the signal processing circuit will be exceeded and saturation will occur.

In this case, the dynamic range necessary for image processing carried out by signal processing circuits in later stages cannot be ensured, and a correction method such as that described in Japanese Patent Laid-Open No. 2008-118293 will therefore no longer be usable. Note that the same problem occurs in configurations where A/D conversion is carried out in each of column readout circuits within the image sensor.

SUMMARY OF THE INVENTION

Having been achieved in light of the aforementioned problem, the present invention provides an image capturing apparatus capable of ensuring a dynamic range even in the case where dark current has increased.

According to a first aspect of the present invention, there is provided an image capturing apparatus comprising: a pixel region in which unit pixels, each of which includes a plurality of photoelectric conversion portions, are disposed; a floating diffusion portion which converts signal charges transferred from the plurality of photoelectric conversion portions in each of the unit pixels into voltage signals; an output line on which a signal based on a voltage at the floating diffusion portion is output; and a switching unit that switches between a first readout mode, in which all of the signal charges from the plurality of photoelectric conversion portions in each of the unit pixels are transferred to the floating diffusion portion and read out from the output line, and a second readout mode, in which the signal charges from the plurality of photoelectric conversion portions in each of the unit pixels are transferred at least one at a time to the floating diffusion portion and read out from the output line independently, wherein the switching unit switches the readout mode based on a dark current amount.

According to a second aspect of the present invention, there is provided A method of controlling an image capturing apparatus, the image capturing apparatus including a pixel region in which unit pixels, each of which includes a plurality of photoelectric conversion portions, are disposed, a floating diffusion portion which converts signal charges transferred from the plurality of photoelectric conversion portions in each of the unit pixels into voltage signals, and an output line on which a signal based on a voltage at the floating diffusion portion is output, and the method comprising: a switching step of switching between a first readout mode, in which all of the signal charges from the plurality of photoelectric conversion portions in each of the unit pixels are transferred to the floating diffusion portion and read out from the output line, and a second readout mode, in which the signal charges from the plurality of photoelectric conversion portions are transferred at least one at a time to the floating diffusion portion in each of the unit pixels and read out from the output line independently, wherein in the switching step, the readout mode is switched based on a dark current amount.

Further features of the present invention will become apparent from the following description of exemplary embodiments (with reference to the attached drawings).

BRIEF DESCRIPTION OF THE DRAWINGS

FIGS. 7A and 7B are diagrams illustrating examples of shooting conditions for switching a readout mode of the image capturing apparatus.

FIG. 8 is a diagram illustrating a relationship between dark current and a dynamic range.

DESCRIPTION OF THE EMBODIMENTS

Hereinafter, embodiments of the present invention will be described in detail with reference to the appended drawings.

First Embodiment

Figure 1:
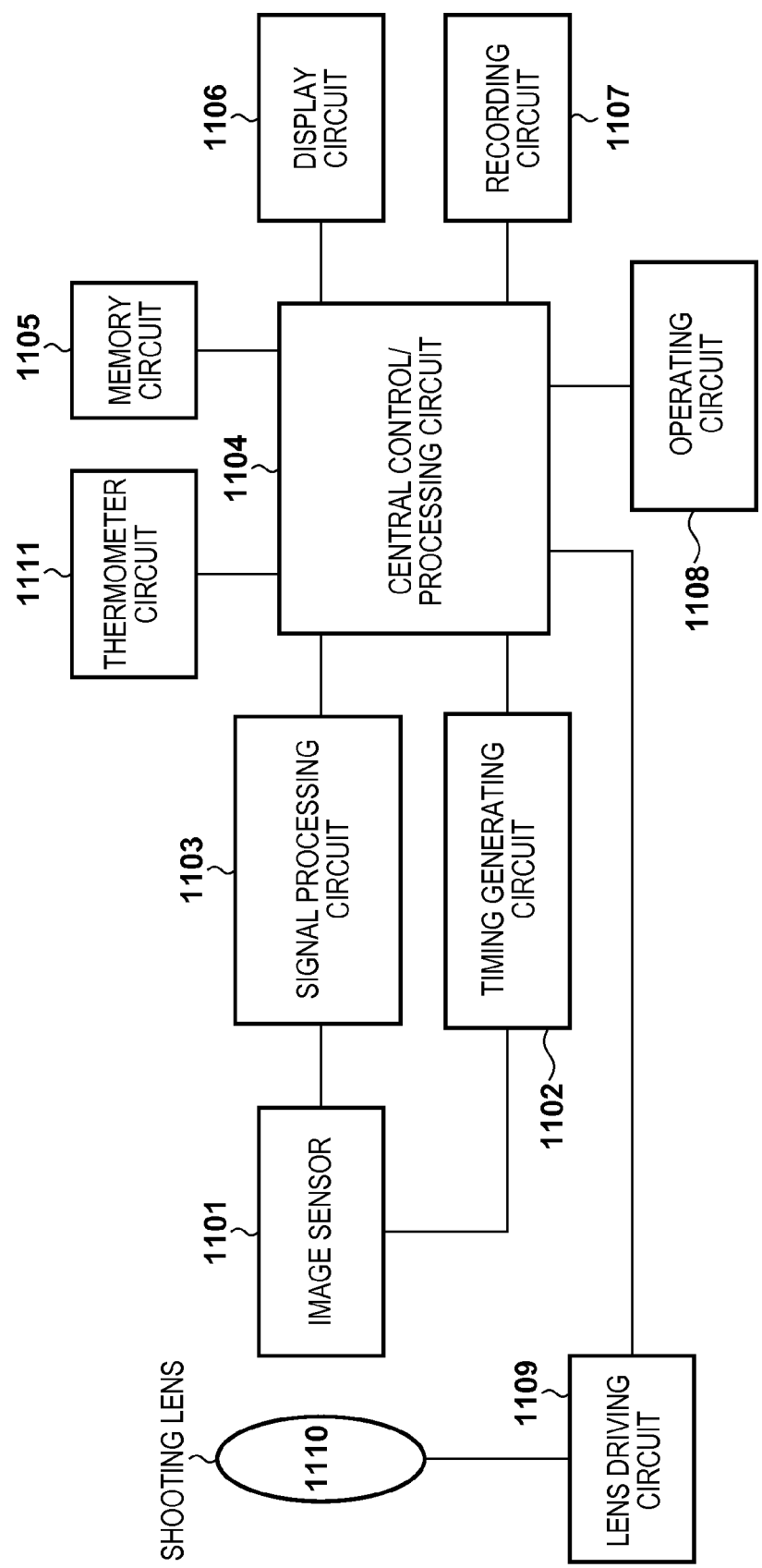
FIG. 1 is a block diagram illustrating an image capturing apparatus according to a first embodiment as a whole.

FIG. 1 is a block diagram illustrating an image capturing apparatus according to a first embodiment of the present invention as a whole. As illustrated in FIG. 1, a shooting lens 1110 is an optical system that forms an optical image of a subject on an image sensor 1101, and a lens driving circuit 1109 carries out zoom control, focus control, aperture control, and so on. The image sensor 1101 obtains the subject image formed by the shooting lens 1110 as an image signal, and unit pixels are arranged in an array therein. A signal processing circuit 1103 carries out A/D conversion, an OB clamping process that will be mentioned later, and so on, on the image signal output from the image sensor 1101. A timing generating circuit 1102 outputs a driving timing signal to the image sensor 1101. A central control/processing circuit 1104 carries out various types of computations and controls the image capturing apparatus as a whole, and furthermore carries out various types of signal processing such as white balance correction, gamma correction, and so on. A memory circuit 1105 temporarily stores image data, and a display circuit 1106 displays various types of information, captured images, and so on. A recording circuit 1107 is a removable recording medium, such as a semiconductor memory or the like, for recording or reading out image data. An operating circuit 1108 is a circuit for electrically accepting operations made through an operating member of the image capturing apparatus. A user sets shooting conditions (an ISO sensitivity, an accumulation time, and so on) through the operating circuit 1108. A thermometer circuit 1111 obtains a temperature during shooting. Data of the obtained temperature is used by the central control/processing circuit 1104 in controlling the image capturing apparatus.

Figure 2:
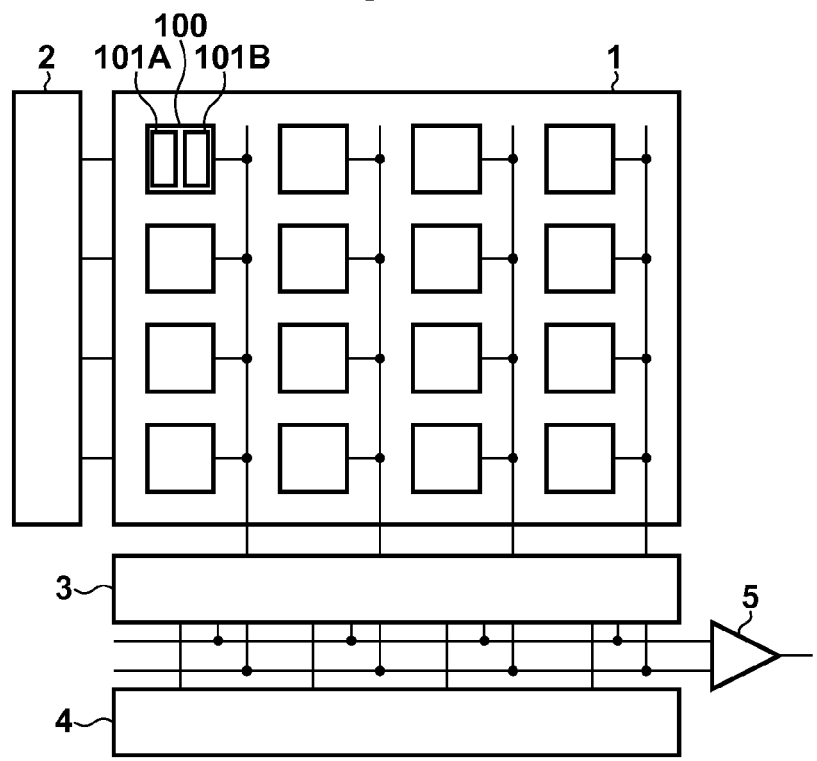
FIG. 2 is a block diagram illustrating the overall configuration of an image sensor according to the first embodiment.

Next, the configuration of the image sensor 1101 indicated in FIG. 1 will be described using FIG. 2 to FIG. 4. FIG. 2 is a diagram illustrating the overall configuration of the image sensor 1101. The image sensor 1101 includes a pixel region 1, a vertical scanning circuit 2, a readout circuit 3, a horizontal scanning circuit 4, and an output amp 5.

A plurality of unit pixels 100 are arranged in matrix in the pixel region 1. Although a 4×4 arrangement for a total of 16 pixels is illustrated here to simplify the descriptions, in reality, many more pixels than this are provided. Each unit pixel 100 includes a microlens (not shown), a first photodiode 101A, and a second photodiode 101B. Some of the pixels in the pixel region 1 are optical black (OB) pixels in which the photodiodes 101A and 101B are shielded from light, and are used in an OB clamping process, which will be described later.

The vertical scanning circuit 2 selects pixels in the pixel region 1 in units of rows, and sends a driving signal to the pixels in the selected row. The readout circuit 3 has column readout circuits for each column, amplifying output signals from the unit pixels 100 and sampling/holding the output signals. The horizontal scanning circuit 4 sends a signal for sequentially outputting the signals sampled/held by the readout circuit 3 to the output amp 5 on a column-by-column basis. The output amp 5 outputs, to the exterior, the signals output from the readout circuit 3.

Figure 3:
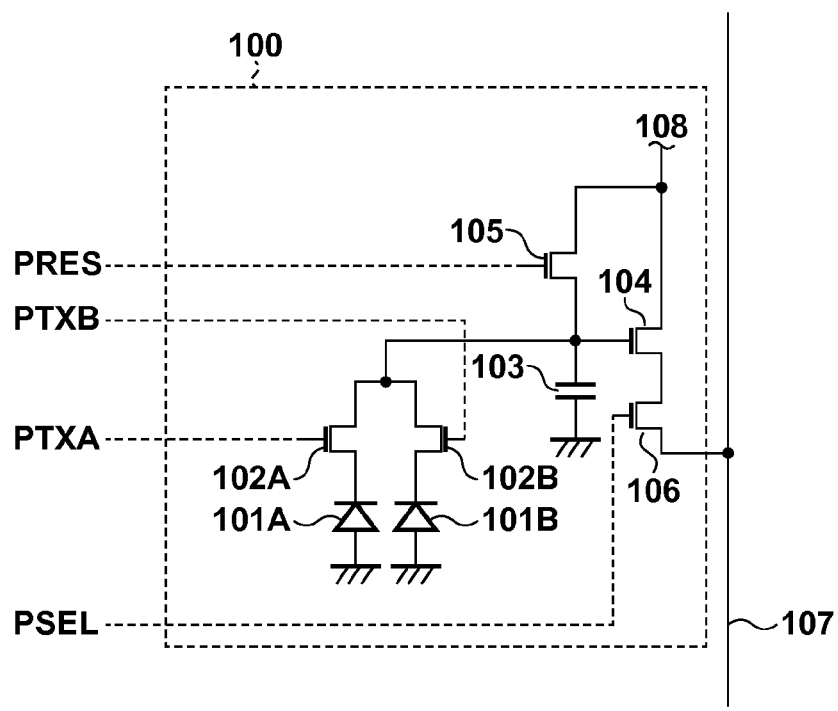
FIG. 3 is a circuit diagram illustrating a unit pixel in the image sensor.

FIG. 3 is a circuit diagram illustrating the unit pixel 100 in the image sensor according to the present embodiment. As illustrated in FIG. 3, the unit pixel 100 has the first photodiode 101A, the second photodiode 101B, a first transfer switch 102A, and a second transfer switch 102B. The unit pixel 100 further has a floating diffusion portion 103, an amplifying portion 104, a reset switch 105, and a selection switch 106.

The photodiodes 101A and 101B receive light through the same microlens, and each functions as a photoelectric conversion portion that generates a signal charge based on the received light amount. The transfer switches 102A and 102B transfer the charges generated by the photodiodes 101A and 101B, respectively, to the same floating diffusion portion 103. The transfer switches 102A and 102B are controlled by transfer pulse signals PTXA and PTXB, respectively. The floating diffusion portion 103 temporarily holds the charges transferred from the photodiodes 101A and 101B, and functions as a charge-voltage conversion portion that converts the held charge into a voltage signal.

The amplifying portion 104 is a source-follower MOS transistor, amplifying the voltage signal based on the charge held in the floating diffusion portion 103 and outputting the resultant as a pixel signal. The reset switch 105 is controlled by a reset pulse signal PRES, and resets a potential of the floating diffusion portion 103 to a reference potential VDD. The selection switch 106 is controlled by a vertical selection pulse signal PSEL, and outputs the pixel signal amplified by the amplifying portion 104 to a vertical output line 107. 108 indicates a common power source VDD.

Figure 4:
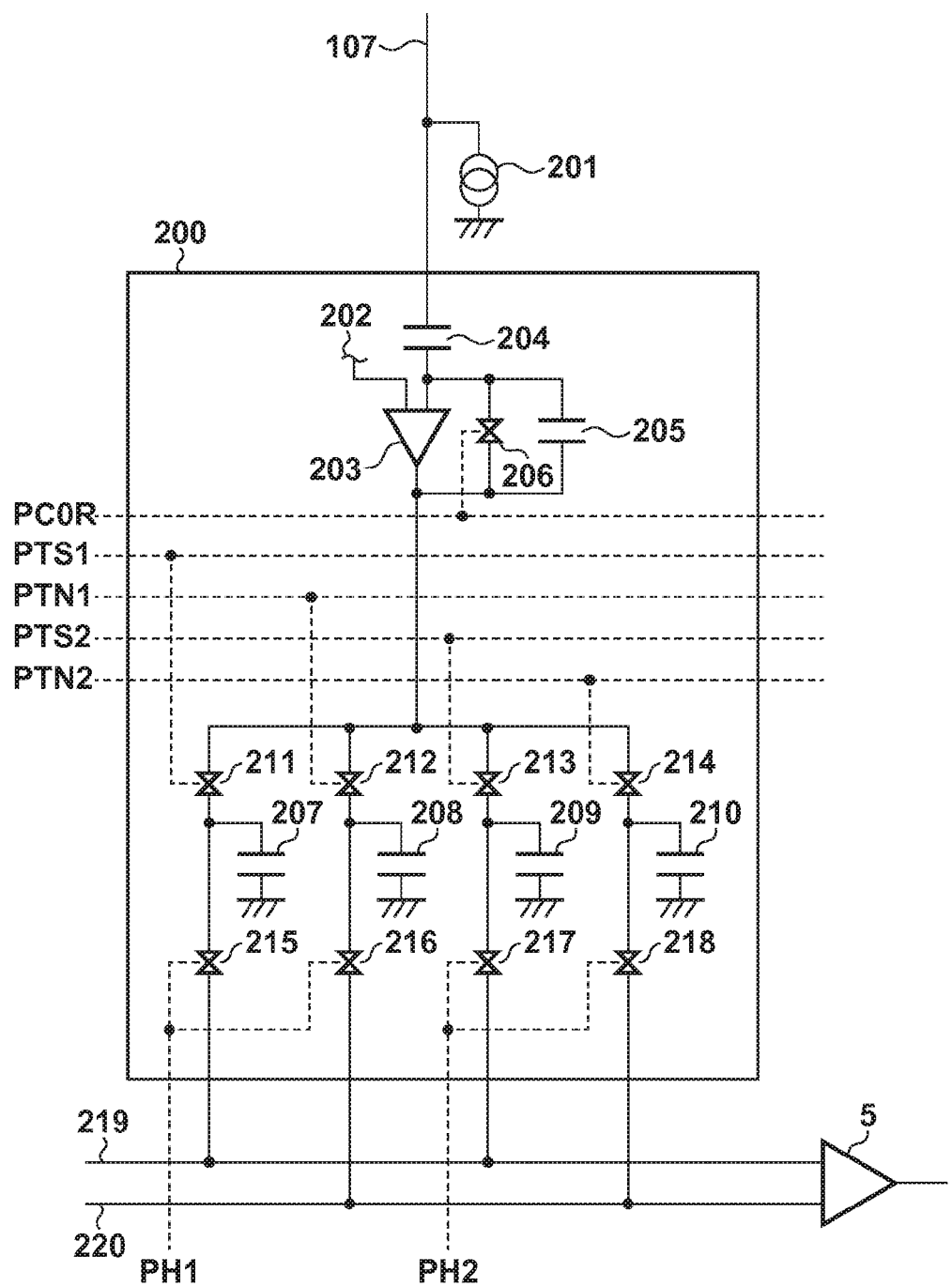
FIG. 4 is a circuit diagram illustrating a readout circuit in the image sensor.

FIG. 4 is a diagram illustrating the configuration of the readout circuit 3 in detail. Although the readout circuit 3 has a column readout circuit 200 for each column, the configuration is the same for each column and thus only a first column is illustrated here. As illustrated in FIG. 4, an op-amp 203 is a portion for amplifying a signal voltage on the vertical output line 107, and multiplies a gain based on a shooting ISO sensitivity. Note that the portion that multiplies the gain based on the shooting ISO sensitivity is not limited to an op-amp, and another portion may be used as long as that portion multiplies the gain prior to the OB clamping process, which will be mentioned later.

A reference power source VREF 202 supplies a reference voltage to the op-amp. The column readout circuit 200 further has a clamp capacitor C0 (204), a feedback capacitor Cf (205), and a switch 206 for shorting input/output ends of the op-amp 203. The switch 206 is controlled by a signal PC0R. Note that a constant current source 201 is connected to the vertical output line 107.

Capacitors 207, 208, 209, and 210 are capacitors for holding the signal voltage, and hereinafter, the capacitor 207 will be referred to as a capacitor CTS1, the capacitor 208 as a capacitor CTN1, the capacitor 209 as a capacitor CTS2, and the capacitor 210 as a capacitor CTN2. Switches 211, 212, 213, and 214 control writes to the capacitors CTS1, CTN1, CTS2, and CTN2, respectively. The switches 211 and 212 are controlled by a signal PTS1 and a signal PTN1, respectively. The switches 213 and 214 are controlled by a signal PTS2 and a signal PTN2, respectively.

Switches 215 and 216 are controlled by a signal PH1 from the horizontal scanning circuit 4, and a signal written into the capacitor CTS1 (207) is output to the output amp 5 via a common output line 219 and a signal written into the capacitor CTN1 (208) to the output amp 5 via a common output line 220. Switches 217 and 218 are controlled by a signal PH2 from the horizontal scanning circuit 4, and a signal written into the capacitor CTS2 (209) is output to the output amp 5 via the common output line 219 and a signal written into the capacitor CTN2 (210) to the output amp 5 via the common output line 220.

Next, driving timings of the image sensor according to the present embodiment will be described using FIG. 5 and FIG. 6. The image sensor according to the present embodiment has a merging readout mode in which the signals from the two photodiodes 101A and 101B of the unit pixel 100 are merged in the floating diffusion portion 103 and read out, and an independent readout mode in which the signals from the two photodiodes 101A and 101B are read out independently. Here, the signal read out from the photodiode 101A will be called an A signal, the signal read out from the photodiode 101B a B signal, and the signal read out after merging the signals from the two photodiodes 101A and 101B an A+B signal.

Figure 5:
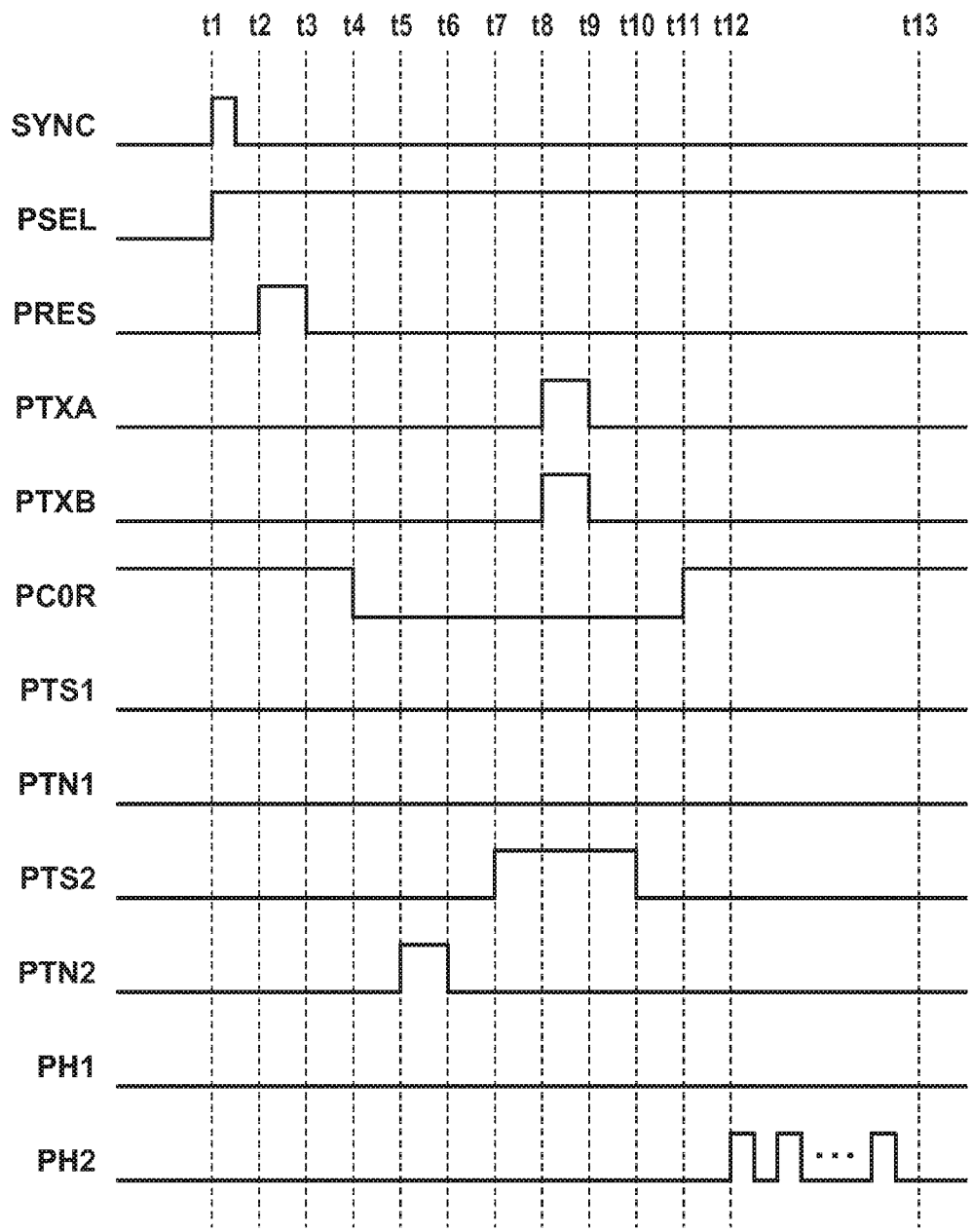
FIG. 5 is a driving timing chart illustrating a merging readout mode according to the first embodiment.

FIG. 5 is a driving timing chart illustrating the merging readout mode. FIG. 5 illustrates a driving timing during readout when the vertical scanning circuit 2 has selected a given row. At time t1, when a horizontal synchronization signal SYNC is input, a selection pulse signal PSEL of the selected row rises from L to H. As a result, the selection switches 106 in the selected row turn on, and the pixels in the selected row are connected to the vertical output lines 107. At time t2, the reset pulse signal PRES rises from L to H, the reset switches 105 turn on, and the potentials at the floating diffusion portions 103 are reset to the power source VDD. At time t3, the reset pulse signal PRES falls from H to L, the reset switches 105 turn off, and the reset of the floating diffusion portions 103 is canceled. At this time, the potentials at the floating diffusion portions 103 are read out to the vertical output lines 107 as reset signal levels via the amplifying portions 104, and are inputted to the corresponding column readout circuits 200. At the column readout circuits 200, the reset signal levels are input in a state in which the op-amps 203 buffer the output of a reference voltage Vref (the signal PC0R is H and thus the switches 206 are on).

Then, at time t4, the signal PC0R falls from H to L, and in order to write the reset signal level at that time into the capacitors CTN2, the signal PTN2 rises to H at time t5, and the switches 214 turn on. At time t6, the signals PTN2 falls to L, the switches 214 turn off, and the writing ends. At time t7, the signal PTS2 rises to H and the switches 213 turn on, resulting in a state in which signals can be written to the capacitors CTS2.

Next, at times t8-t9, transfer pulse signals PTXA and PTXB simultaneously rise from L to H and then fall again to L, causing the transfer switches 102A and 102B to go from off, to on, and to off again. Due to this operation, photoelectric charges accumulated in the photodiodes 101A and 101B are read out to the corresponding floating diffusion portions 103. Outputs based on those changes are then supplied to the column readout circuits 200 via the corresponding amplifying portions 104 and vertical output lines 107. In each column readout circuit 200, an inverse gain is applied for the voltage change at a ratio between the clamp capacitor C0 (204) and the feedback capacitor Cf (205), and the resultant is output. This voltage is then written into the capacitor CTS2. At time t10, the signal PTS2 switches from H to L, the switches 213 turn off, and the writing ends. The writing of signals into the capacitors CTN2 and CTS2 is completed through the stated operations. Here, the A+B signal, which is the sum of the signals output from the photodiodes 101A and 101B, is obtained from a difference between the signals held in the capacitors CTS2 and CTN2. This A+B signal serves as a captured image.

Next, at time t11, the signal PC0R rises to H again, the switches 206 turn on, and in the column readout circuits 200, the op-amps 203 return to a state of buffering the output of the reference voltage Vref. Then, the signals held in the capacitors CTN2 and CTS2 are read out during t12-t13. A driving pulse PH2 from the horizontal scanning circuit 4 sequentially rises from L to H and falls back to L for each readout circuit, and as a result the switches 217 and 218 turn off, to on, and then off again. The signals held in the capacitors CTS2 and CTN2 of the column turned on by the switches 217 and 218 are read out to the common output lines 219 and 220, respectively, and a resulting differential voltage is output from the output amp 5. This differential voltage serves as the A+B signal. Note that the common output lines 219 and 220 are reset to the reference potential by a reset switch (not shown) each time the signals of the respective columns are read out. The operations described above are carried out sequentially for each row, and the A+B signal readout is completed as a result. The A+B signal is output from the image sensor. This signal is used as an image capturing signal.

Next, driving timing during the independent readout mode will be described using FIG. 6. FIG. 6 is a driving timing chart illustrating the independent readout mode of the image sensor according to the present embodiment. Operations from time t1-t4 are the same as in the merging readout mode illustrated in FIG. 5, and thus descriptions thereof will be omitted. At time t14-t15, the signal PTN1 rises from L to H and falls to L again, the switches 212 go from off, to on, and to off again, and the reset signal level is written into CTN1. At time t16, the signal PTS1 rises to H and the switches 211 turn on, resulting in a state in which signals can be written to the capacitors CTS1. Next, at time t17-t18, a transfer pulse signal PTXA rises from L to H and falls back to L, and the photoelectric charges of the photodiodes 101A are transferred to the corresponding floating diffusion portions 103. Outputs based on those changes are then supplied to the column readout circuits 200 via the corresponding amplifying portions 104 and vertical output lines 107, an inverse gain is applied thereto by the op-amps 203, and the resultants are output. This output voltages are then written into the capacitors CTS1. At time t19, the signal PTS2 switches from H to L, the switches 213 turn off, and the writing ends.

Next, at time t20-t21, the reset pulse signal PRES rises from L to H and falls back to L, the reset switches 105 go from off, to on, and to off again, and the potentials at the floating diffusion portions 103 are reset to the power source VDD. At time t22-t23, the signal PTN2 rises from L to H and falls to L again, the switches 214 go from off, to on, and to off again, and the reset signal level at that time is written into the capacitors CTN2. At time t24, the signal PTS2 rises to H and the switches 213 turn on, resulting in a state in which signals can be written to the capacitors CTS2. Next, at time t25-t26, a transfer pulse signal PTXB rises from L to H and falls back to L, and the photoelectric charges of the photodiodes 101B are transferred to the corresponding floating diffusion portions 103. Voltage signals based on the read-out charge amounts are supplied to the corresponding column readout circuits 200 in the same manner as when the charges of the photodiodes 101A are read out, an inverse gain is applied thereto by the op-amps 203, and the resultants are output. This voltage is then written into the capacitor CTS2. At time t27, the signal PTS2 switches from H to L, the switches 213 turn off, and the writing ends. The writing of signals into the capacitors CTN1, CTS1, CTN2, and CTS2 is completed through the stated operations.

Here, the A signal, which is an output signal from the photodiode 101A, is obtained from the difference between the signals held in the capacitor CTS1 and the capacitor CTN1, and the B signal, which is an output signal from the photodiode 101B, is obtained from the difference between the signals held in the capacitor CTS2 and the capacitor CTN2.

Next, at time t28, the signal PC0R rises to H again, the switches 206 turn on, and in the column readout circuits 200, the op-amps 203 return to a state of buffering the output of the reference voltage Vref. Then, the signals held in the capacitors CTN1 and CTS1 are read out during t29-t30. A driving pulse PH1 from the horizontal scanning circuit 4 sequentially rises from L to H and falls back to L for each readout circuit, and as a result the switches 215 and 216 turn off, to on, and then off again. The signals held in the capacitors CTS1 and CTN1 of the column turned on by the switches 215 and 216 are read out to the common output lines 219 and 220, respectively, and a resulting differential voltage is output from the output amp 5. This differential voltage serves as the A signal.

Next, the signals held in the capacitors CTN2 and CTS2 are read out during t30-t31. A driving pulse PH2 from the horizontal scanning circuit 4 sequentially rises from L to H and falls back to L for each readout circuit, and as a result the switches 217 and 218 turn off, to on, and then off again. The signals held in the capacitors CTS2 and CTN2 of the column turned on by the switches 217 and 218 are read out to the common output lines 219 and 220, respectively, and a resulting differential voltage is output from the output amp 5. This differential voltage serves as the B signal.

The operations described above are carried out sequentially for each row, and the A signal and B signal readouts are completed as a result. The read-out A signal and B signal can be used as a captured image by the central control/processing circuit 1104 merging those signals and obtaining the A+B signal.

Figure 6:
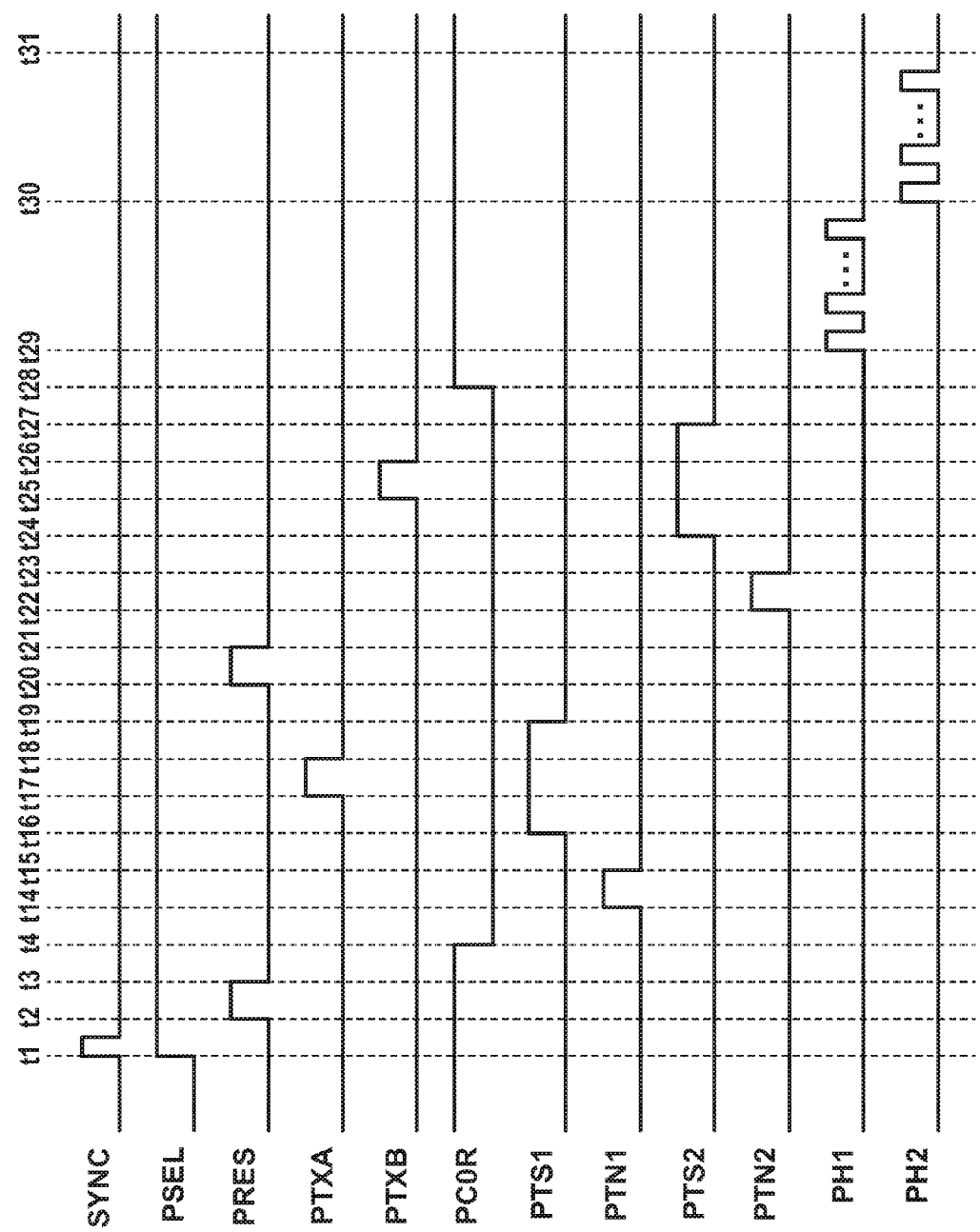
FIG. 6 is a driving timing chart illustrating an independent readout mode.

In the present embodiment, the merging readout mode and the independent readout mode illustrated in FIG. 5 and FIG. 6, respectively, are switched based on shooting conditions. FIGS. 7A and 7B illustrate examples of the shooting conditions for switching between the two readout modes. The readout mode is switched based on the ISO sensitivity (ISO), the accumulation time (Tv), and a shooting temperature (tmp); a mode selection table illustrated in FIG. 7A is used when tmp<45° C., and a mode selection table illustrated in FIG. 7B is used when 45° C.≤tmp. In FIGS. 7A and 7B, the independent readout mode is selected more frequently under conditions of higher ISO sensitivities, longer accumulation times, and higher shooting temperatures. In other words, control is carried out so that the independent readout mode is selected under shooting conditions where dark current increases in the output signal from the image sensor 1101. Note that the number of mode selection tables, the cutoff values for the conditions for switching the readout mode, and so on illustrated in FIGS. 7A and 7B are merely examples and are not limited thereto.

A relationship between dark current contained in the output signal from the image sensor 1101 and a dynamic range will be described using FIG. 8. A signal exceeding an AD conversion dynamic range 800 indicated in FIG. 8 will saturate when input to the signal processing circuit from the image sensor.

8a in FIG. 8 indicates an example of the output signal in the case where the A+B signal is read out in the merging readout mode under shooting conditions in which dark current is low (a low ISO sensitivity, short exposure, and normal temperature, for example). In 8a of FIG. 8, a signal in which dark current 802 is added to an image signal 801 is output from the image sensor. When the signal processing circuit 1103 carries out the OB clamping process and the dark current 802 is removed, the remainder serves as a dynamic range 803 of the image signal.

8b in FIG. 8 indicates an example of the output signal in the case where the A+B signal is read out in the merging readout mode under shooting conditions in which dark current is large (a high ISO sensitivity, long exposure, and high temperature, for example). A large dark current 805 is added to an image signal 804. Accordingly, the dynamic range after the dark current 805 is removed through the OB clamping process is that indicated by 806. In this manner, the dynamic range of the image signal drops under shooting conditions in which the dark current is large.

Meanwhile, 8c in FIG. 8 indicates an example of the output from the image sensor in the case where the A signal and the B signal are read out in the independent readout mode under shooting conditions in which the dark current is large, as in 8b of FIG. 8. In the A signal, a dark current 808 is added to an image signal 807 and the signal is read out, and in the B signal, a dark current 810 is added to an image signal 809 and the signal is read out. In the independent readout mode, the output signals from the two photodiodes are read out independently, and thus the dark currents 808 and 810 contained in the output signals from the photodiodes 101A and 101B are each approximately half the dark current 805 occurring in the merging readout mode. Accordingly, if the OB clamping process is carried out on the A signal and the B signal, the dark currents 808 and 810 are removed therefrom, and the A signal and the B signal are then merged, the dynamic range can at maximum be increased to a range obtained by merging a range 811 and a range 812. Accordingly, a wider dynamic range can be obtained even under shooting conditions where there is a large dark current by using the independent readout mode, as compared to using the merging readout mode.

However, as indicated in the timing charts of FIG. 5 and FIG. 6, the independent readout mode has a longer readout time than the merging readout mode. Accordingly, carrying out control so that the merging readout mode is used under shooting conditions where the dark current is small and the independent readout mode is used under shooting conditions where the dark current is large makes it possible to prevent an unnecessary increase in the readout time.

Figure 9:
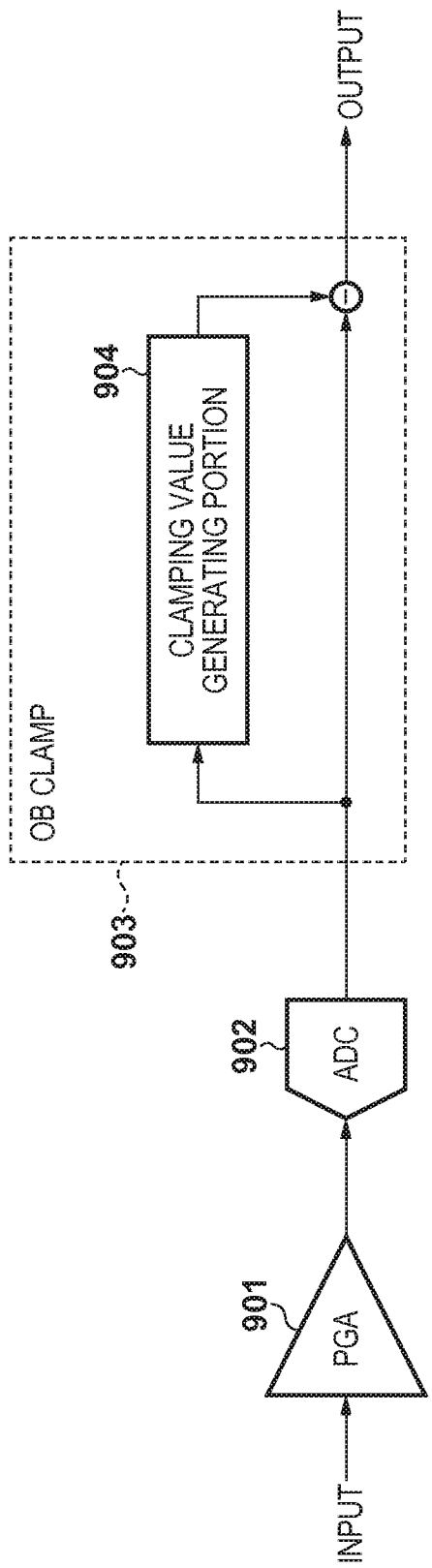
FIG. 9 is a block diagram illustrating a signal processing circuit.

Next, OB clamping operations will be described using FIG. 9. FIG. 9 is a block diagram illustrating the signal processing circuit 1103. A signal output from the image sensor 1101 is multiplied by a gain for sensitivity adjustment in a programmable gain amp (PGA) 901. An analog-digital converter (ADC) 902 converts an output signal from the PGA 901 from analog format to digital format.

An OB clamp block 903 is a block for matching a black level of the output signal to a reference value. An output signal from an OB pixel region of the image sensor 1101 is input into a clamping value generating portion 904, where a clamping value for reducing a difference between the level of the signal and the black level reference value is generated. A dark current component generated in the unit pixel 100 can be removed by subtracting this clamping value from the output signal. The stated OB clamping process is carried out on the A+B signal in the case of the merging readout mode and is carried out on the A signal and the B signal, respectively, in the case of the independent readout mode.

Although the OB clamping process is carried out after A/D conversion in the present embodiment, it should be noted that the configuration may be such that the OB clamping process is carried out on the pre-A/D conversion analog signal. Furthermore, although the signal processing circuit 1103 carries out the A/D conversion and the OB clamping process in the present embodiment, these processes may be carried out within the image sensor 1101. For example, the configuration may be such that an A/D converter is provided and A/D conversion carried out in each column readout circuit, and digitized signals then undergo the OB clamping process in an OB clamping circuit provided within the image sensor.

Figure 10:
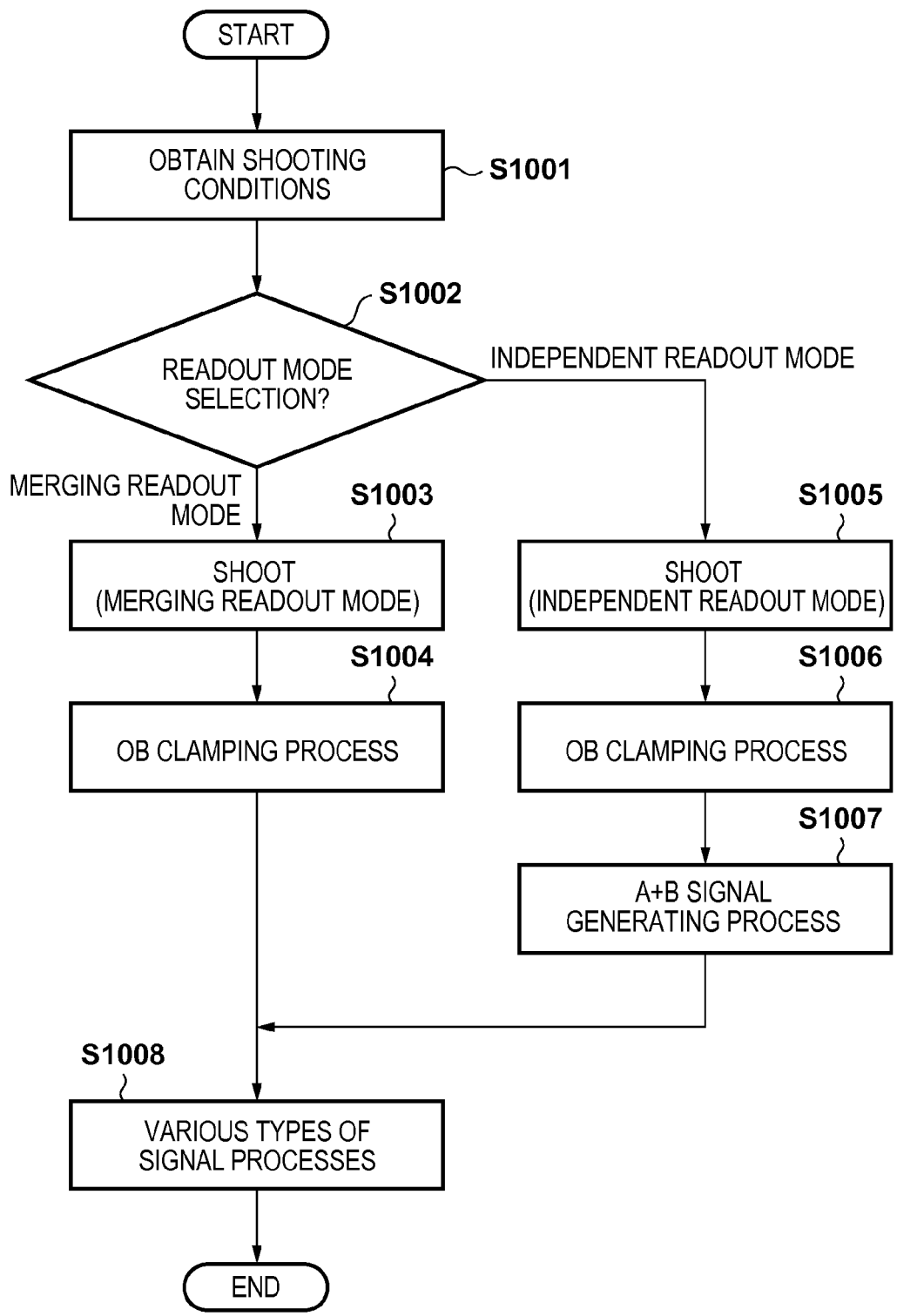
FIG. 10 is a control flowchart for the image capturing apparatus according to the first embodiment.

A control method for the image capturing apparatus during shooting according to the present embodiment will be described using the flowchart illustrated in FIG. 10.

When shooting starts, first, the ISO sensitivity and accumulation time set through the operating circuit 1108 and the temperature data from the thermometer circuit 1111 are obtained (S1001). Next, the readout mode is selected based on the obtained ISO sensitivity, accumulation time, and temperature information (S1002). Selecting between the merging readout mode and the independent readout mode is carried out based on the conditions indicated in FIGS. 7A and 7B, for example. In the case where the merging readout mode is selected, the processing moves to S1003, where the driving signals indicated in FIG. 5 are sent to the image sensor 1101 from the timing generating circuit 1102 and shooting is carried out in the merging readout mode. The A+B signal is then output from the image sensor 1101.

The read-out A+B signal undergoes the OB clamping process in the signal processing circuit 1103, and the dark current component is removed therefrom (S1004). In the case where the independent readout mode is selected in S1002, the processing moves to S1005, where the driving signals indicated in FIG. 6 are sent to the image sensor 1101 from the timing generating circuit 1102 and shooting is carried out in the independent readout mode. The A signal and the B signal are then output from the image sensor 1101. The read-out A signal and B signal each undergoes the OB clamping process in the signal processing circuit 1103, and the dark current component is removed therefrom (S1006).

Thereafter, the central control/processing circuit 1104 merges the A signal and the B signal, and the captured image is generated (S1007). Finally, the central control/processing circuit 1104 carries out various types of signal processes on the captured image, such as white balance correction, gamma correction, and the like, a final image is generated, and the series of processes ends (S1008).

According to the present embodiment as described thus far, control is carried out so that the merging readout mode is used under shooting conditions in which there is little dark current and the independent readout mode is used under shooting conditions in which there is a large dark current. This makes it possible to ensure a wide dynamic range even in the case of a large dark current. Meanwhile, the merging readout mode is used under shooting conditions in which the dark current is small, and thus an unnecessary increase in the readout time can be prevented.

Although the present embodiment describes a configuration in which two photodiodes are provided for each unit pixel, the number of photodiodes in each unit pixel is not limited thereto. For example, four photodiodes may be provided in each unit pixel, with signals from the four photodiodes being merged by the floating diffusion and read out in the merging readout mode, and the signals from the four photodiodes being read out independently in the independent readout mode. In addition, two each of the signals from the four photodiodes may be merged by the floating diffusion and read out in the independent readout mode.

Second Embodiment

The image sensor according to the first embodiment and a second embodiment of the present invention has two photodiodes for each pixel, and the configuration is such that the respective photodiodes receive light traversing mutually different pupil regions of the shooting lens using a single microlens. Accordingly, the shooting lens can also carry out focal point detection by comparing the output signals from the two photodiodes. Accordingly, as an example of an application of the first embodiment, the present embodiment describes a control method that can also carry out focal point detection while taking measures against a drop in the dynamic range due to dark current. Like the first embodiment, an image capturing apparatus according to the second embodiment has a merging readout mode and an independent readout mode.

In the independent readout mode, the A signal and the B signal are read out from the image sensor 1101. The driving timing chart here is the same as in the first embodiment and illustrated in FIG. 6, and thus descriptions thereof will be omitted.

Figure 11:
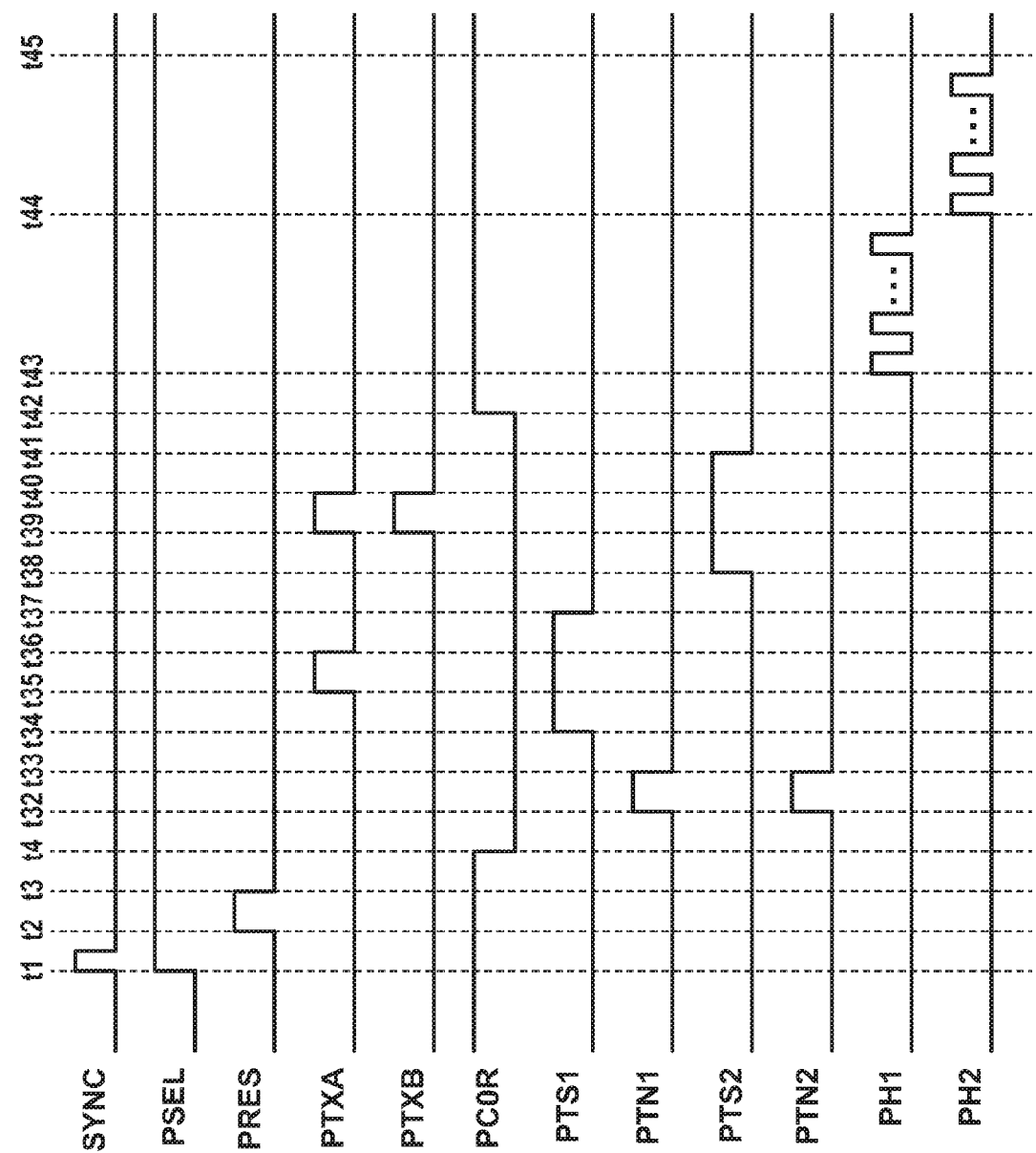
FIG. 11 is a driving timing chart illustrating a merging readout mode according to a second embodiment.

FIG. 11 is a driving timing chart illustrating the merging readout mode according to the second embodiment. In FIG. 11, operations from time t1-t4 are the same as in the merging readout mode illustrated in FIG. 5, and thus descriptions thereof will be omitted.

At time t32-t33, the signal PTN1 and the signal PTN2 rise from L to H and fall to L again, the switches 212 and 214 go from off, to on, and to off again, and the reset signal level at that time is written into the capacitors CTN1 and the capacitors CTN2. At time t34, the signal PTS1 rises to H and the switches 211 turn on, resulting in a state in which signals can be written to the capacitors CTS1. Next, at time t35-t36, the transfer pulse signal PTXA rises from L to H and falls back to L, and the photoelectric charges of the photodiodes 101A are transferred to the corresponding floating diffusion portions 103. Outputs based on those changes are then supplied to the column readout circuits 200 via the corresponding amplifying portions 104 and vertical output lines 107. In each column readout circuit 200, an inverse gain is applied for the voltage change at a ratio between the clamp capacitor C0 (204) and the feedback capacitor Cf (205), and the resultant is output. This voltage is then written into the capacitor CTS1. At time t37, the signal PTS1 switches from H to L, the switches 211 turn off, and the writing ends.

At time t38, the signal PTS2 rises to H and the switches 213 turn on, resulting in a state in which signals can be written to the capacitors CTS2. Next, at time t39, the transfer pulse signal PTXA rises to H again, and at the same time, the transfer pulse signal PTXB also rises to H. The photoelectric charges in both the photodiode 101A and the photodiode 101B can be read out to the corresponding floating diffusion portion 103 simultaneously as a result of this operation. Then, at time t40, the transfer pulse signals PTXA and PTXB fall to L. The read-out charges are supplied to the corresponding column readout circuits 200 in the same manner as when the charges of the photodiodes 101A are read out, an inverse gain is applied thereto by the op-amps 203, and the resultants are output. This voltage is then written into the capacitor CTS2. At time t41, the signal PTS2 switches from H to L, the switches 213 turn off, and the writing ends. Although the transfer pulse signals PTXA and PTXB rise to H simultaneously at time t39, the operation may be such that only the transfer pulse signal PTXB rises to H.

The writing of signals into the capacitors CTN1, CTS1, CTN2, and CTS2 is completed through the stated operations.

Here, the A signal, which is the signal output from the photodiode 101A, is obtained from a difference between the signals held in the capacitors CTS1 and CTN1. Likewise, the A+B signal, which is the sum of the signals output from the photodiodes 101A and 101B, is obtained from a difference between the signals held in the capacitors CTS2 and CTN2.

Next, at time t42, the signal PC0R rises to H again, the switches 206 turn on, and in the column readout circuits 200, the op-amps 203 return to a state of buffering the output of the reference voltage Vref. Then, the signals held in the capacitors CTN1 and CTS1 are read out during t43-t44 as a differential voltage from the output amp 5. The signals held in the capacitors CTN2 and CTS2 are read out during t44-t45 as a differential voltage from the output amp 5. The operations described above are carried out sequentially for each row, and the A signal and A+B signal readouts are completed as a result.

Although the signal PTN1 and the signal PTN2 rise to H and the reset signal level is written into both the capacitor CTN1 and the capacitor CTN2 at time t32, the operation may be such that the reset signal level is written only into the capacitor CTN1. In this case, the signals in the capacitors CTN1, CTS1, and CTS2 may each be read out, the A signal obtained from a difference between the signals in the capacitor CTS1 and the capacitor CTN1, and the A+B signal obtained from a difference between the signals in the capacitor CTS2 and the capacitor CTN1.

As described thus far, in the second embodiment, the A signal and the A+B signal are read out in the merging readout mode, and the A signal and the B signal are read out in the independent readout mode.

Figure 12:
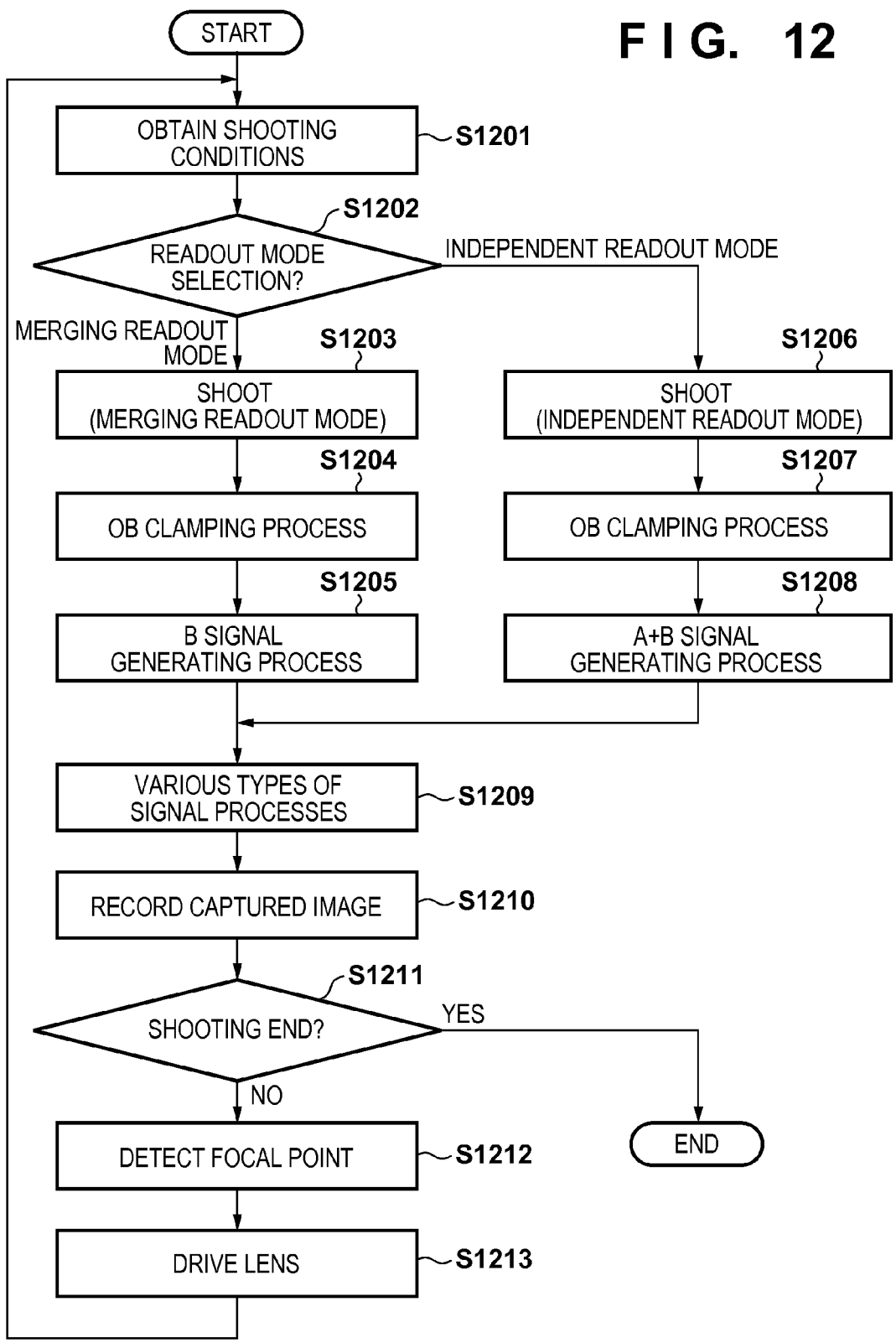
FIG. 12 is a control flowchart for an image capturing apparatus according to the second embodiment.

FIG. 12 is a flowchart illustrating the flow of shooting operations according to the second embodiment. FIG. 12 illustrates an example of a flow of operations during continuous shooting, and focal point detection is carried out in addition to the shooting.

When shooting starts, first, the ISO sensitivity and accumulation time set through the operating circuit 1108 and the temperature data from the thermometer circuit 1111 are obtained (S1201). Next, the readout mode is selected based on the obtained ISO sensitivity, accumulation time, and temperature information (S1202). Selecting between the merging readout mode and the independent readout mode is carried out based on the conditions indicated in FIGS. 7A and 7B, for example.

In the case where the merging readout mode is selected, the processing moves to S1203, where the driving signals indicated in FIG. 11 are sent to the image sensor 1101 from the timing generating circuit 1102 and shooting is carried out in the merging readout mode. The A signal and the A+B signal are then output from the image sensor 1101. The read-out A signal and A+B signal each undergoes the OB clamping process in the signal processing circuit 1103, and the dark current component is removed therefrom (S1204). Thereafter, the central control/processing circuit 1104 generates the B signal from the difference between the A+B signal and the A signal (S1205). The generated B signal and the A signal and A+B signal are temporarily held in the memory circuit 1105.

In the case where the independent readout mode is selected in S1202, the processing moves to S1206, where the driving signals indicated in FIG. 6 are sent to the image sensor 1101 from the timing generating circuit 1102 and shooting is carried out in the independent readout mode. The A signal and the B signal are then output from the image sensor 1101. The read-out A signal and B signal each undergoes the OB clamping process in the signal processing circuit 1103, and the dark current component is removed therefrom (S1207). Thereafter, the central control/processing circuit 1104 merges the A signal and the B signal, and the A+B signal is generated (S1208). The generated A+B signal and the A signal and B signal are temporarily held in the memory circuit 1105.

In S1209, the central control/processing circuit 1104 carries out various types of signal processes on the A+B signal, such as white balance correction, gamma correction, and the like, and a final captured image is generated. The generated captured image is recorded into the recording circuit 1107 (S1210). Thereafter, in S1211, it is determined whether or not to end the shooting; in the case where the shooting is continued, an image is obtained again after first adjusting the focus. In S1212, a known correlation process is carried out using the A signal and the B signal, and a defocus amount of the shooting lens is calculated from a phase difference (image skew amount) between the two signals. These processes are carried out by the central control/processing circuit 1104. A driving amount of the shooting lens is then set based on the defocus amount. In S1213, the lens is driven by the lens driving circuit 1109 based on the set driving amount. After this, the process returns to step S1201.

By carrying out the stated control, a wide dynamic range can be ensured even in the case of a large dark current, in the same manner as in the first embodiment. Focal point detection can also be carried out at the same time.

Third Embodiment

In the first and second embodiments, the readout mode is switched under shooting conditions in which the dark current amount increases based on the mode selection table. The present embodiment describes an example in which the dark current amount is calculated from part of a captured image and the readout mode is then switched based on that dark current amount.

Figure 13:
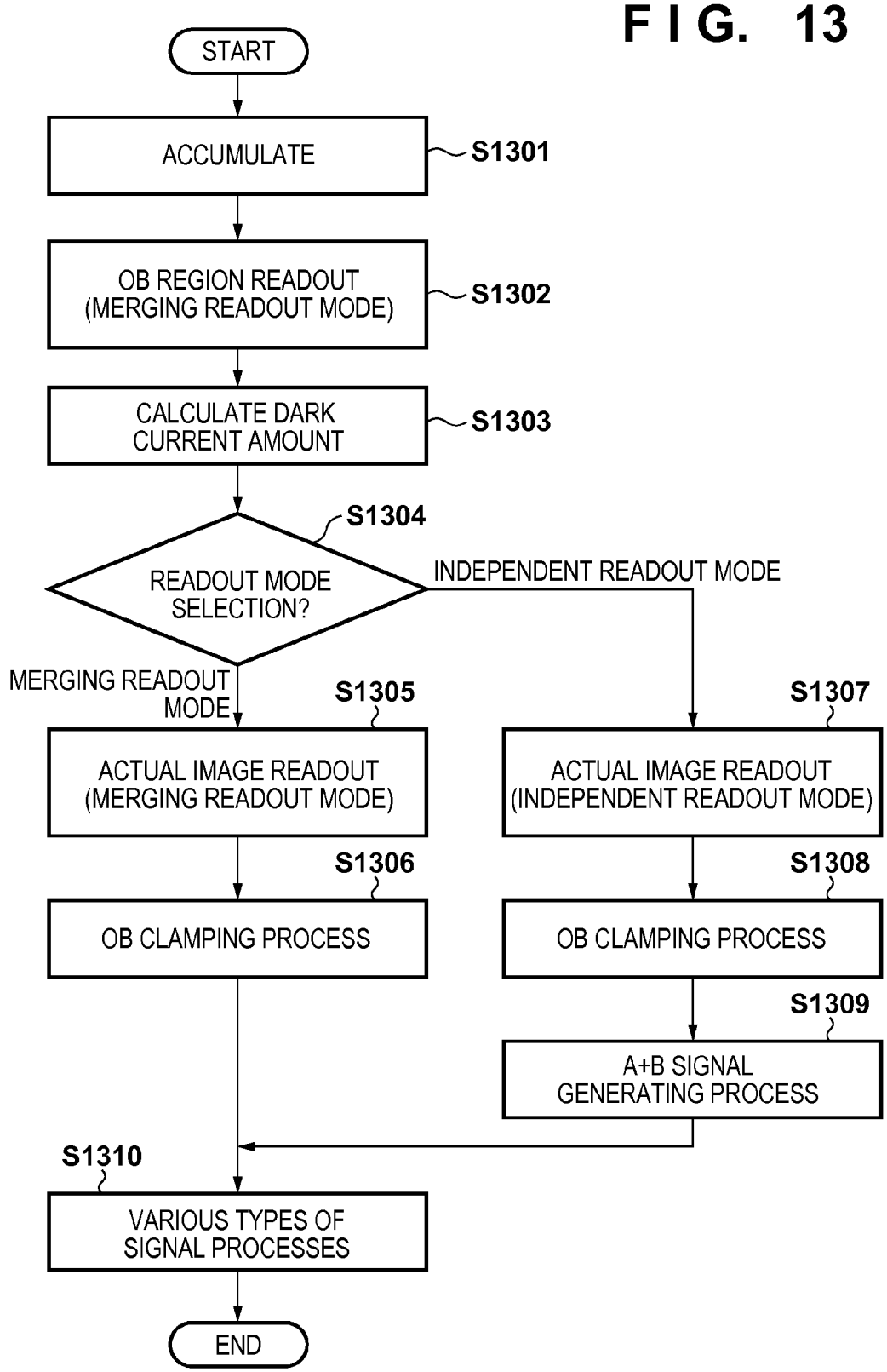
FIG. 13 is a control flowchart for an image capturing apparatus according to a third embodiment.

FIG. 13 is a flowchart illustrating the flow of shooting operations according to the third embodiment. When shooting starts, first, the image sensor 1101 accumulates a signal (S1301). When a predetermined time of accumulation ends, only pixels in a part of the OB pixel region provided in the pixel region 1 (several rows, for example) are read out using the merging readout mode illustrated in FIG. 5 (S1302). The readout mode at this time may be the independent readout mode illustrated in FIG. 6. The read-out pixel signals from part of the OB pixel region are sent to the central control/processing circuit 1104 without undergoing the OB clamping process in the signal processing circuit 1103. The central control/processing circuit 1104 calculates a dark current amount by calculating an average value or an integrated value of the sent pixel signals from the part of the OB pixel region (S1303). Note that the configuration may be such that the process of S1303 carries out the OB clamping process of the signal processing circuit 1103 on the pixel signals from the part of the OB pixel region read out in S1302, and the dark current amount may be calculated based on the clamping value generated by the clamping value generating portion 904 at that time.

The calculated dark current amount is then compared to a predetermined threshold, and the readout mode is selected based on a result of the comparison (S1304). Here, the merging readout mode is selected in the case where the dark current amount is less than the predetermined threshold, and the independent readout mode is selected in the case where the dark current amount is greater than or equal to the predetermined threshold.

In the case where the merging readout mode is selected, the processing moves to S1305, where the driving signals indicated in FIG. 5 are sent to the image sensor 1101 and signals of a pixel region aside from the partial OB region read out in S1302 (that is, an actual image) are read out as the A+B signal in the merging readout mode. Note that the accumulation time in S1301 is set in consideration of the amount of time required for the processing from S1302 to S1304. The actual image read out as the A+B signal undergoes the OB clamping process in the signal processing circuit 1103, and the dark current component is removed therefrom (S1306).

In the case where the independent readout mode is selected in S1304, the processing moves to S1307, where the driving signals indicated in FIG. 6 are sent to the image sensor 1101. Then, signals of the pixel region aside from the partial OB region read out in S1302 (that is, the actual image) are read out as the A signal and the B signal in the independent readout mode. The read-out A signal and B signal each undergoes the OB clamping process in the signal processing circuit 1103, and the dark current component is removed therefrom (S1308). Thereafter, the central control/processing circuit 1104 merges the A signal and the B signal, and the A+B signal serving as the captured image is generated (S1309). Finally, the central control/processing circuit 1104 carries out various types of signal processes on the captured image, such as white balance correction, gamma correction, and the like, a final image is generated, and the series of processes ends (S1310).

According to the present embodiment as described thus far, part of the OB pixel region is read out first, and the dark current amount is calculated from that output signal. Control is then carried out so that the merging readout mode is used in the case where the calculated dark current amount is small and the independent readout mode is used in the case where the calculated dark current amount is large. This makes it possible to ensure a wide dynamic range even in the case of a large dark current.

Although the present embodiment describes calculating the dark current amount by first reading out part of the OB pixel region, the configuration may be such that the dark current amount is calculated from part of the OB pixel region from the immediately-previous shooting (or previous frame, in the case of shooting video).

Other Embodiments

Embodiments of the present invention can also be realized by a computer of a system or apparatus that reads out and executes computer executable instructions (e. g., one or more programs) recorded on a storage medium (which may also be referred to more fully as a 'non-transitory computer-readable storage medium') to perform the functions of one or more of the above-described embodiments and/or that includes one or more circuits (e. g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e. g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-130684, filed Jun. 25, 2014, which is hereby incorporated by reference herein in its entirety.

What is claimed is:

1. An image capturing apparatus comprising:
   a pixel region in which unit pixels, each of which includes a microlens and a plurality of photoelectric conversion portions, are disposed; and
   a controller that switches between a first readout mode, in which signals of the plurality of photoelectric conversion portions in each of the unit pixels are merged in each of the unit pixels to be output from each of the unit pixels, and a second readout mode, in which the signals of the plurality of photoelectric conversion portions in each of the unit pixels are not merged in each of the unit pixels and to be independently output from each of the unit pixels,
   wherein the controller switches the readout mode based on a parameter relating to a dark current level.

2. The image capturing apparatus according to claim 1, further comprising:
   a clamping circuit that clamps a dark current generated by the photoelectric conversion portions; and
   an merging processor that merges signals from the plurality of photoelectric conversion portions read out in the second readout mode,
   wherein the merging processor merges the signals from the plurality of photoelectric conversion portions after the dark current is clamped by the clamping circuit.

3. The image capturing apparatus according to claim 1, further comprising:
   a calculator that calculates the dark current amount,
   wherein the controller switches the readout mode based on the dark current amount calculated by the calculator.

4. The image capturing apparatus according to claim 1, wherein the controller switches the readout mode based on at least one of an imaging sensitivity, an accumulation time, a temperature, and a signal value obtained from reference unit pixels.

5. The image capturing apparatus according to claim 4, further comprising:

an output line on which signals of the unit pixels are output;
an amplifier that amplifies the signals output from the output line based on the imaging sensitivity,
wherein the amplifier amplifies the signals output from the output line before the clamping circuit, and the controller switches the readout mode based on an amount of the amplification performed by the amplifier.

6. The image capturing apparatus according to claim 4, further comprising:
a temperature sensor that obtains the temperature, wherein the controller switches the readout mode based on the temperature obtained by the temperature sensor.

7. An image capturing apparatus according to claim 1, wherein each of the unit pixels further includes a floating diffusion portion which converts signal charges transferred from the plurality of photoelectric conversion portions in each of the unit pixels into voltage signals, and in the first readout mode, the signal charges from the plurality of photoelectric conversion portions are merged in the floating diffusion portion of each of the unit pixels.

8. The image capturing apparatus according to claim 7, wherein the first readout mode carries out a first readout operation that transfers the signal charge of at least one of the photoelectric conversion portions to the floating diffusion portion and reads out a voltage signal from the unit pixel before all of the signal charges of the plurality of photoelectric conversion portions are transferred to the floating diffusion portion.

9. The image capturing apparatus according to claim 8, wherein a signal read out in the first readout operation of the first readout mode or a signal read out in the second readout mode is used in focal point detection.

10. An image capturing apparatus according to claim 1, wherein the controller selects the second readout mode in a case where the dark current level is large, and selects the first readout mode in a case where the dark current level is small.

11. A method of controlling an image capturing apparatus, the image capturing apparatus including a pixel region in which unit pixels, each of which includes a microlens and a plurality of photoelectric conversion portions, are disposed, and the method comprising:
switching between a first readout mode, in which signals of the plurality of photoelectric conversion portions in each of the unit pixels are merged in each of the unit pixels to be output from each of the unit pixels, and a second readout mode, in which the signals of the plurality of photoelectric conversion portions in each of the unit pixels are not merged in each of the unit pixels and are to be independently output from each of the unit pixels,
wherein in the switching, the readout mode is switched based on a parameter relating to a dark current level.

12. A computer-readable storage medium on which is stored a program for causing a computer to execute the steps of the control method according to claim 11.

* * * * *